United States Patent
Maeda et al.

(10) Patent No.: US 10,890,155 B2
(45) Date of Patent: Jan. 12, 2021

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Hirofumi Maeda, Kanagawa (JP); Masaharu Kassai, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/615,206

(22) PCT Filed: May 24, 2017

(86) PCT No.: PCT/JP2017/019428
§ 371 (c)(1),
(2) Date: Nov. 20, 2019

(87) PCT Pub. No.: WO2018/216153
PCT Pub. Date: Nov. 29, 2018

(65) Prior Publication Data
US 2020/0173417 A1 Jun. 4, 2020

(51) Int. Cl.
| *F02P 5/14* | (2006.01) |
| *F02D 41/04* | (2006.01) |
| *F02P 5/145* | (2006.01) |
| *F02D 41/14* | (2006.01) |
| *F02D 41/40* | (2006.01) |

(52) U.S. Cl.
CPC .............. *F02P 5/145* (2013.01); *F02D 41/04* (2013.01); *F02D 41/1454* (2013.01); *F02D 41/40* (2013.01)

(58) Field of Classification Search
CPC ... F02P 5/14; F02P 5/145; F02D 41/04; F02D 41/1454; F02D 41/40
See application file for complete search history.

(56) References Cited

U.S. PATENT DOCUMENTS

| 6,244,241 | B1 * | 6/2001 | Mamiya | F02D 41/2461 123/295 |
| 7,597,085 | B2 * | 10/2009 | Ashizawa | F02D 41/3029 123/301 |

(Continued)

FOREIGN PATENT DOCUMENTS

| DE | 10031874 A1 | 1/2002 |
| JP | 11-303721 A | 11/1999 |

(Continued)

*Primary Examiner* — Hieu T Vo
(74) *Attorney, Agent, or Firm* — Foley & Lardner LLP

(57) ABSTRACT

In a control method for internal combustion engine for forming a stratified air-fuel mixture in a combustion chamber and performing stratified combustion by injecting fuel at least once each time between an intake stroke and the first half of a compression stroke and in the second half of the compression stroke, spark ignition is started by flowing a relatively large discharge current into the ignition plug when flow energy around the ignition plug is increased by energy of a fuel spray injected in the second half of the compression stroke and, thereafter, the discharge current is made relatively smaller and discharged for a predetermined period.

5 Claims, 17 Drawing Sheets

(56) References Cited

U.S. PATENT DOCUMENTS

| | | |
|---|---|---|
| 2003/0154954 A1 | 8/2003 | Vogel et al. |
| 2016/0115880 A1 | 4/2016 | Kondo et al. |
| 2017/0122281 A1 | 5/2017 | Imanaka et al. |
| 2020/0109682 A1* | 4/2020 | Kassai ................ F02D 41/3064 |

FOREIGN PATENT DOCUMENTS

| | | |
|---|---|---|
| JP | 2004-245171 A | 9/2004 |
| JP | 2006-46276 A | 2/2006 |
| JP | 2006-307659 A | 11/2006 |
| JP | 2007-292059 A | 11/2007 |
| JP | 2011-94604 A | 5/2011 |
| JP | 2015-187439 A | 10/2015 |
| JP | 2015-200254 A | 11/2015 |

* cited by examiner

CONTROL METHOD AND CONTROL DEVICE FOR INTERNAL COMBUSTION ENGINE

TECHNICAL FIELD

The present invention relates to a control for internal combustion engine for forming a stratified air-fuel mixture by injecting fuel at least once each time between an intake stroke and the first half of a compression stroke and in the second half of the compression stroke and performing spark ignition while flow energy around an ignition plug is increased by energy of a fuel spray injected in the second half of the compression stroke.

BACKGROUND ART

So-called stratified combustion in which fuel is burned with a combustible air-fuel mixture formed around an ignition plug and a lean air-fuel mixture formed in other parts is known. JP 1999-303721A1 discloses a control for extending a discharge period longer than a discharge period during homogeneous combustion when the stratified combustion is performed during a low-load operation of an internal combustion engine. The control disclosed in the above literature is for avoiding a situation where the combustible air-fuel mixture is absent around the ignition plug during the discharge period.

SUMMARY OF INVENTION

In the case of the stratified combustion, an equivalent ratio around the ignition plug is larger than in the case of the homogeneous combustion in which a homogeneous combustible air-fuel mixture is formed in an entire combustion chamber and burned. That is, during the stratified combustion, the air-fuel mixture around the ignition plug is more easily ignited than during the homogeneous combustion. Thus, a history of a discharge current to obtain stable combustion during the stratified combustion is different from that of a discharge current during the homogeneous combustion.

However, although an ignition timing and the discharge period are mentioned in the above literature, the history of the discharge current suitable for stratified combustion is not mentioned. Thus, the control of the above literature has room for improvement.

Accordingly, the present invention aims to provide a method for making a history of a discharge current suitable for stratified combustion during stratified combustion.

According to one embodiment of this invention, a control method for internal combustion engine for forming a stratified air-fuel mixture in a combustion chamber and performing stratified combustion by injecting fuel at least once each time between an intake stroke and a first half of a compression stroke and in a second half of the compression stroke is provided. The control method comprises: starting spark ignition by flowing a relatively large discharge current into the ignition plug when flow energy around the ignition plug is increased by energy of a fuel spray injected in the second half of the compression stroke; and thereafter making the discharge current relatively smaller and discharging the discharge current for a predetermined period.

DESCRIPTION OF EMBODIMENT

Hereinafter, an embodiment of the present invention is described with reference to the accompanying drawings.

Figure 1:
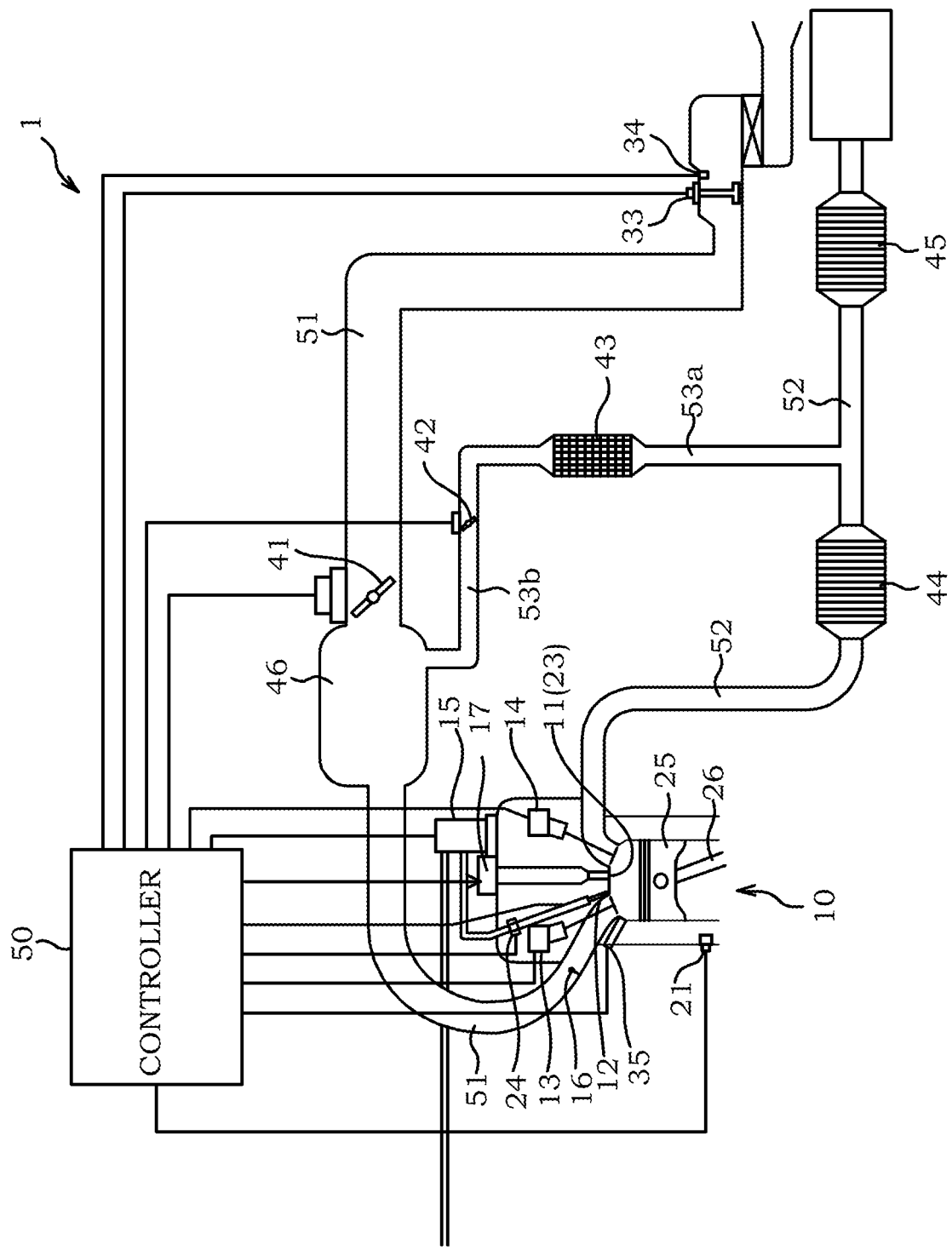
FIG. 1 is a diagram of an overall configuration of an internal combustion engine system.

FIG. 1 is a diagram of an overall configuration of an internal combustion engine system. In the internal combustion engine system 1, an internal combustion engine 10 is connected to an intake passage 51. Further, the internal combustion engine 10 is connected to an exhaust passage 52.

A tumble control valve 16 is provided in the intake passage 51. The tumble control valve 16 generates a tumble flow in a cylinder by closing a part of a flow passage cross-section of the intake passage 51.

A collector tank 46 is provided in the intake passage 51. An EGR passage 53b is also connected to the collector tank 46.

An air flow meter 33 is provided in the intake passage 51. A controller 50 connected to the air flow meter 33 obtains an intake air amount in the intake passage 51 from the air flow meter 33. Further, an intake air temperature sensor 34 is provided in the intake passage 51. The controller 50 connected to the intake air temperature sensor 34 obtains a temperature of air passing in the intake passage 51 from the intake air temperature sensor 34.

Further, an electronically controlled throttle 41 is provided in the intake passage 51 and a throttle position (throttle opening degree) is controlled by the controller 50.

Exhaust gas purifying catalysts 44, 45 for purifying exhaust gas are provided in the exhaust passage 52. Three-way catalysts or the like are used as the exhaust gas purifying catalysts 44, 45. Further, the exhaust passage 52 is branched at an intermediate position thereof into an EGR passage 53 connected to the collector tank 46.

An EGR cooler 43 is provided in the EGR passage 53. Further, an EGR valve 42 is provided in the EGR passage 53. The EGR valve 42 is connected to the controller 50. According to operating conditions of the internal combustion engine 10, a position (opening degree) of the EGR valve 42 is controlled by the controller 50.

The internal combustion engine 10 includes an ignition plug 11, a fuel injection valve 12, an intake-side valve timing control mechanism 13, an exhaust-side valve timing control mechanism 14 and a fuel injection pump 15. The fuel injection valve 12 is a direct injection valve and provided near the ignition plug 11.

The ignition plug 11 performs spark ignition in a combustion chamber of the internal combustion engine 10 by being driven by a driving device 17. The ignition plug 11 is connected to the controller 50 and the controller 50 serving as a control unit controls an ignition timing. It should be noted that the "ignition timing" mentioned in the present embodiment means a timing at which spark ignition is started. Further, the ignition plug 11 also operates as a flow velocity sensor 23 for detecting a gas flow velocity in the discharge gap.

The driving device 17 causes the ignition plug 11 to generate a discharge voltage in accordance with an ignition signal from the controller 50. Further, the driving device 17 includes a circuit for applying a voltage (hereinafter, also referred to as a superimposed voltage) in the same direction as the discharge voltage between electrodes of the ignition plug 11 during a discharge period, in addition to a circuit for spark discharge when discharge is started. Since a configuration for applying the superimposed voltage is known (e.g. JP 2016-53312A1), detailed description is omitted.

By applying the superimposed voltage during the discharge period, a discharge time can be extended. In other words, the discharge period can be arbitrarily controlled by controlling the superimposed voltage.

The fuel injection valve 12 directly injects fuel into the combustion chamber of the internal combustion engine 10. The fuel injection valve 12 is connected to the controller 50 and the controller 50 serving as the control unit controls a fuel injection timing. In the present embodiment, so-called multi-stage injection of injecting the fuel a plurality of times including an intake stroke is performed. The fuel injection pump 15 supplies the pressurized fuel to a fuel supply pipe connected to this fuel injection valve 12.

The intake-side valve timing control mechanism 13 changes opening and closing timings of an intake valve. The exhaust-side valve timing control mechanism 14 changes opening and closing timings of an exhaust valve. The intake-side valve timing control mechanism 13 and the exhaust-side valve timing control mechanism 14 are connected to the controller 50. Opening and closing timings of these mechanisms are controlled by the controller 50. It should be noted that although the intake-side valve timing control mechanism 13 and the exhaust-side valve timing control mechanism 14 are shown here, either one of these may be provided.

An unillustrated crank angle sensor, an unillustrated in-cylinder pressure sensor and an unillustrated accelerator position sensor are provided in the internal combustion engine 10. The crank angle sensor detects a crank angle in the internal combustion engine 10. The crank angle sensor is connected to the controller 50 and sends the crank angle of the internal combustion engine 10 to the controller 50.

The in-cylinder pressure sensor detects a combustion chamber pressure in the internal combustion engine 10. The in-cylinder pressure sensor is connected to the controller 50. The combustion chamber pressure in the internal combustion engine 10 is sent to the controller 50.

The accelerator position sensor detects a depression amount of an accelerator pedal by a driver.

Further, the internal combustion engine 10 may include a knock sensor 21 and a fuel pressure sensor 24. The controller 50 reads outputs from various sensors described above and unillustrated other sensors and controls the ignition timing, valve timings, an air-fuel ratio and the like on the basis of these. It should be noted that the internal combustion engine 10 includes a variable compression ratio control mechanism for changing a mechanical compression ratio and the controller 50 also controls this variable compression ratio control mechanism. The details of the variable compression ratio control mechanism are described later.

Figure 2:
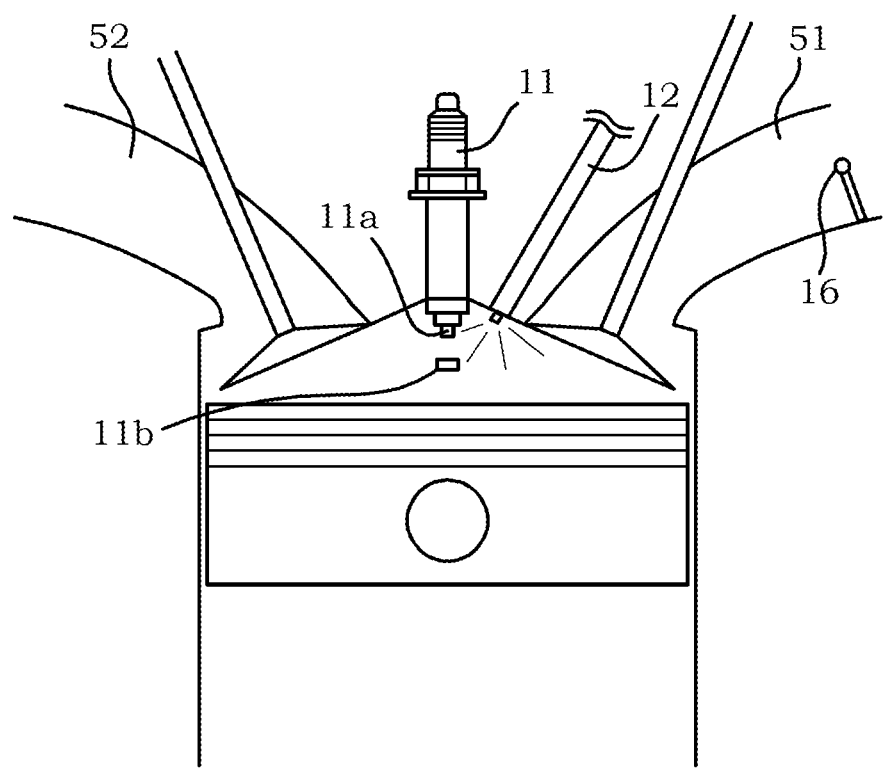
FIG. 2 is a diagram showing how a flow is given near a plug.

FIG. 2 is a diagram showing a positional relationship of the ignition plug 11 and the fuel injection valve 12. As described above, the fuel injection valve 12 is a direct injection valve and provided near the ignition plug 11. Thus, part of the injected fuel passes near a discharge gap, whereby a flow can be given near the ignition plug. It should be noted that the giving of the flow is described later.

Figure 3:
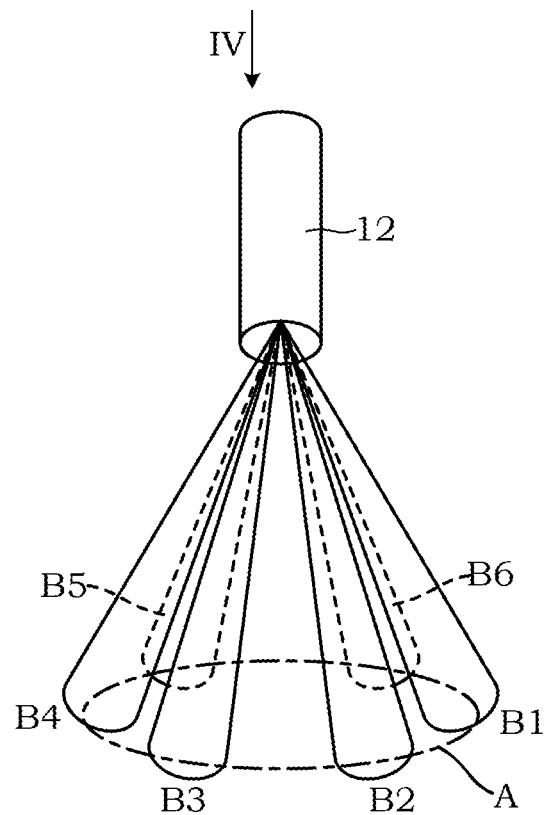
FIG. 3 is a diagram showing an injection mode of a fuel injection valve.
Figure 4:
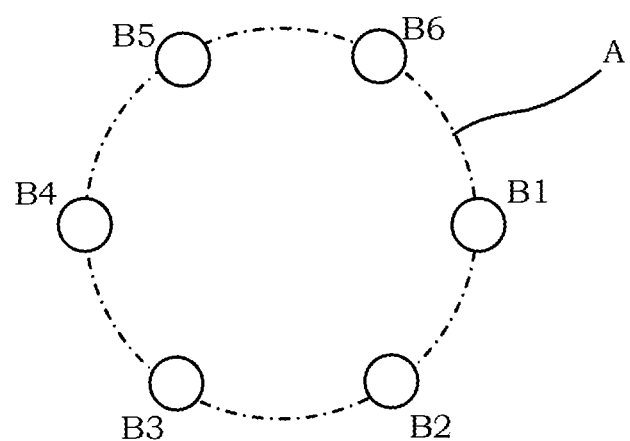
FIG. 4 is a diagram showing spray beams.

FIG. 3 shows a mode of fuel sprays injected from the fuel injection valve 12. FIG. 4 is a view of a plane including a circle A of FIG. 3 viewed in a direction of an arrow IV of FIG. 3.

The fuel injection valve 12 of the present embodiment injects the fuel from six injection holes. If B1 to B6 denote fuel sprays (hereinafter, also referred to as spray beams) injected from the six injection holes, each spray beam has such a conical shape that a spray cross-section becomes larger with distance from the injection hole. Further, cross-sections of the spray beams B1 to B6 cut by the plane including the circle A are arranged at equal intervals in an annular manner as shown in FIG. 4.

Figure 5:
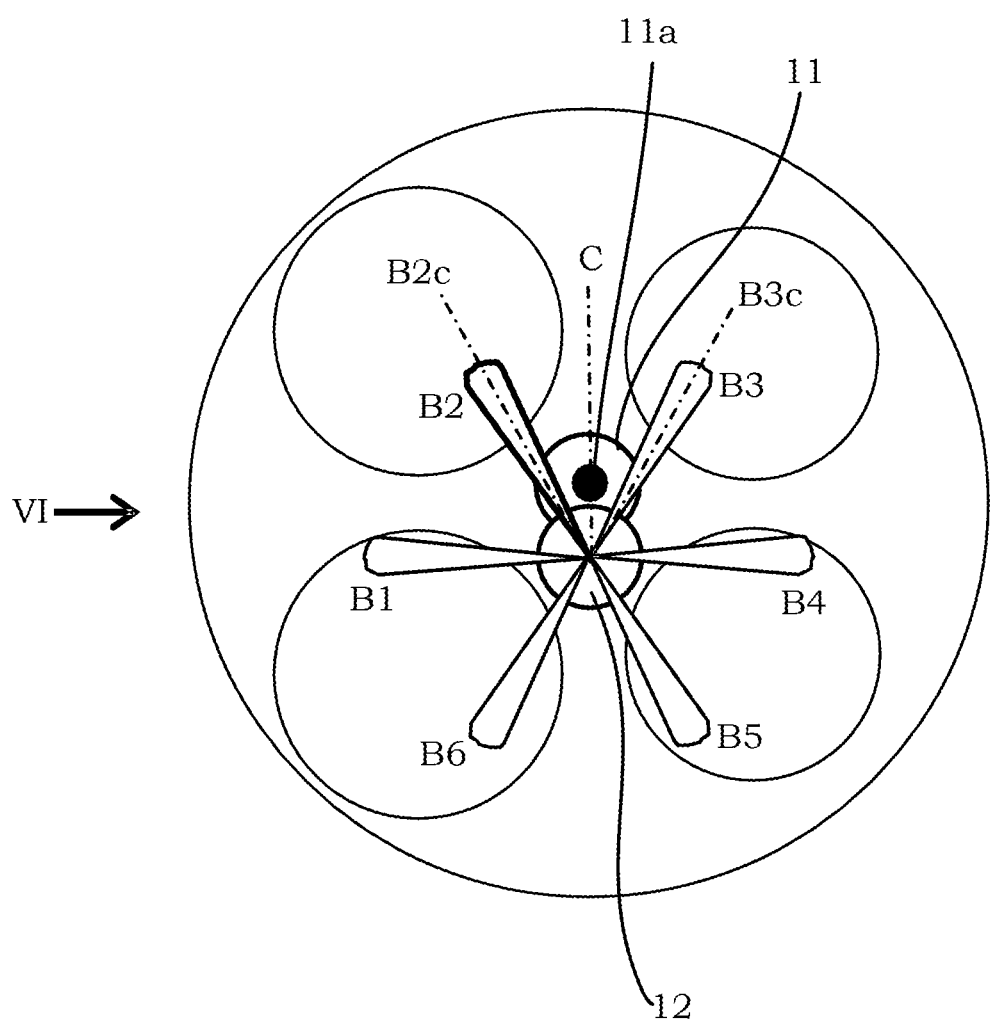
FIG. 5 is a diagram showing the arrangement of an ignition plug and the fuel injection valve.

FIG. 5 is a diagram showing a positional relationship of the spray beams B1 to B6 and the ignition plug 11. The fuel injection valve 12 is arranged on a dashed-dotted line C, which is a bisector of an angle formed between a center axis B2c of the spray beam B2 and a center axis B3c of the spray beam B3.

Figure 6:
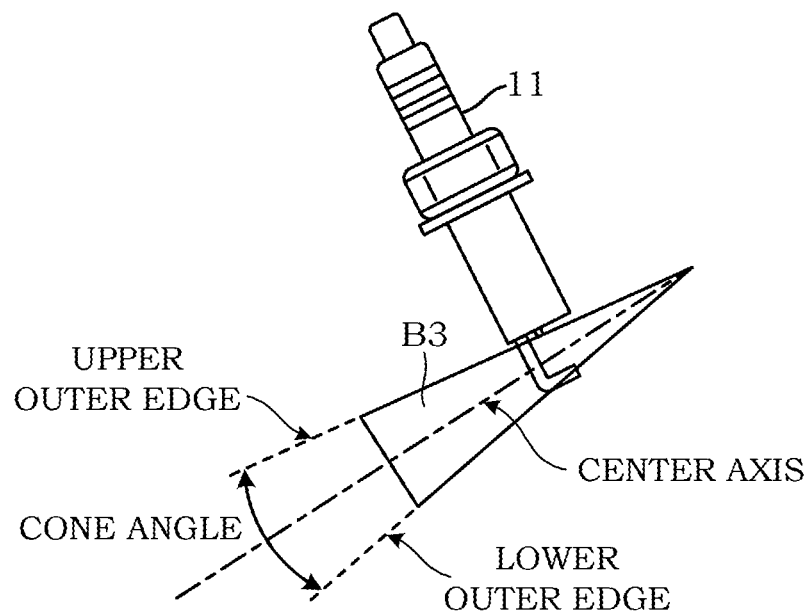
FIG. 6 is a diagram showing a relationship of a discharge region and a spray beam.

FIG. 6 is a diagram showing a positional relationship of the ignition plug 11 and the spray beam B3 when FIG. 5 is viewed in a direction of an arrow VI. In FIG. 6, a discharge region sandwiched by a center electrode 11a and an outer electrode 11b is arranged in a range sandwiched by upper and lower outer edges of the spray beam B3 in FIG. 6. It should be noted that, although not shown, a positional relationship of the ignition plug 11 and the spray beam B2 is symmetrical with that in FIG. 6 and the discharge region is arranged in a range sandwiched by upper and lower outer edges of the spray beam B2 when FIG. 5 is viewed in a direction opposite to the direction of the arrow VI. Specifically, the ignition plug 11 is so arranged that the discharge region is arranged in a range sandwiched by a plane including the upper outer edge of the spray beam B2 and that of the spray beam B3 and a plane including the lower outer edge of the spray beam B2 and that of the spray beam B3.

Figure 7:
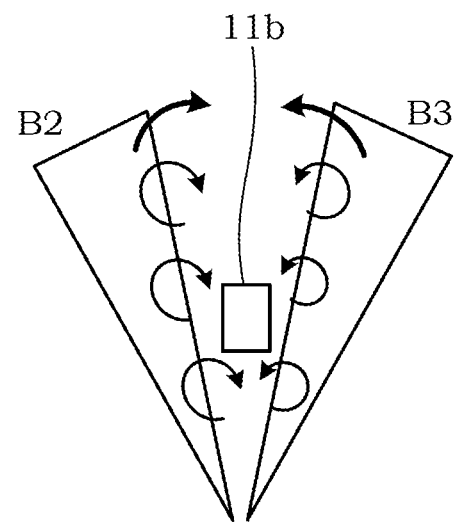
FIG. 7 is a diagram showing a contraction flow.

FIG. 7 is a diagram showing an effect when the spray beams B1 to B6 and the ignition plug 11 are in the positional relationship shown in FIGS. 5 and 6.

The fuel injected from the fuel injection valve 12 is broken up into droplets to become sprays and moves forward while taking in air around as indicated by bold arrows in FIG. 7. In this way, air flow turbulence is generated around the sprays.

Further, if an object (including fluid) is present around, the fluid is attracted to the object and flows along the object by the so-called Coanda effect. Specifically, a so-called contraction flow in which the spray beams B2 and B3 attract each other as shown by thin line arrows of FIG. 7 is generated. Since very strong turbulence is generated between the spray beams B2 and B3 in this way, turbulence intensity around the ignition plug 11 increases.

Here, an intensity change of the tumble flow is described.

Figure 8:
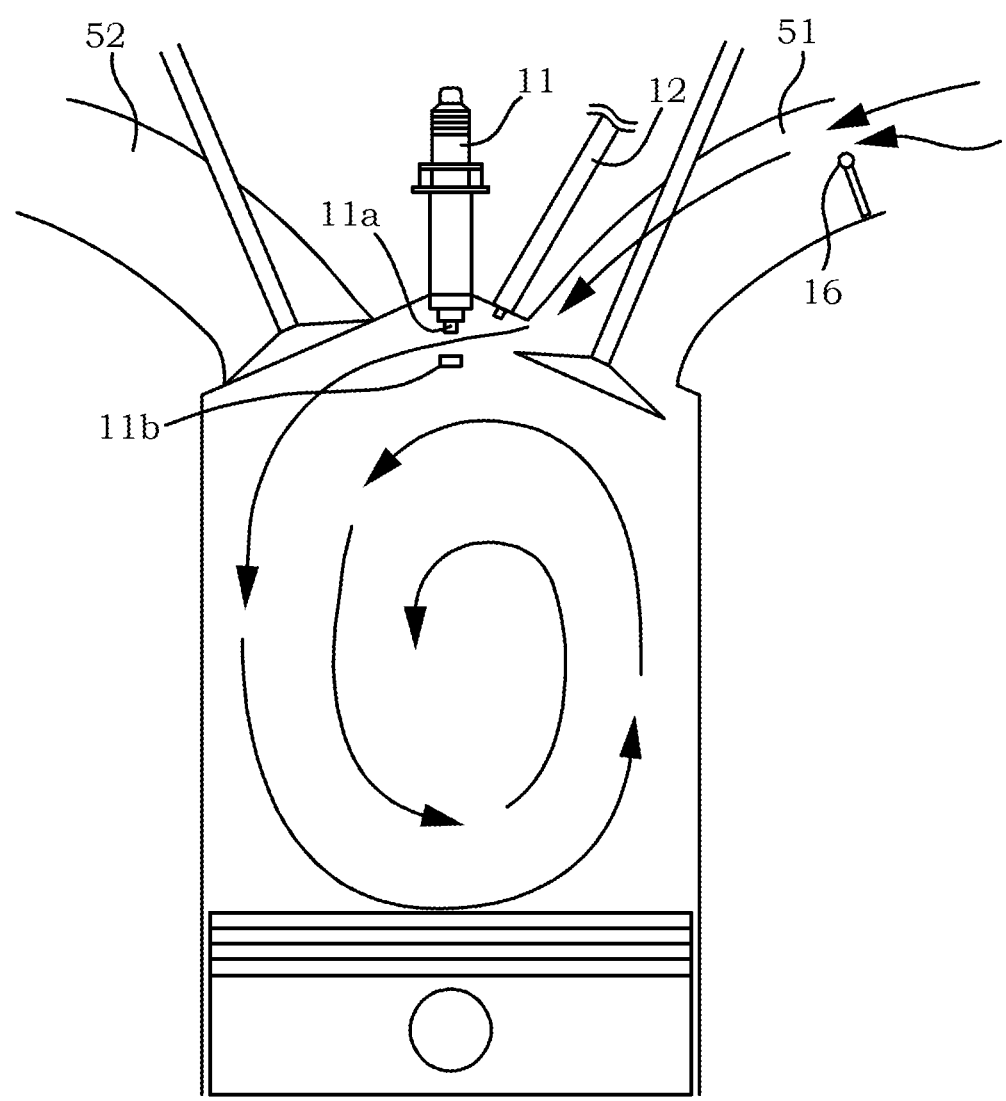
FIG. 8 is a diagram of a tumble flow generated in a cylinder.
Figure 9:
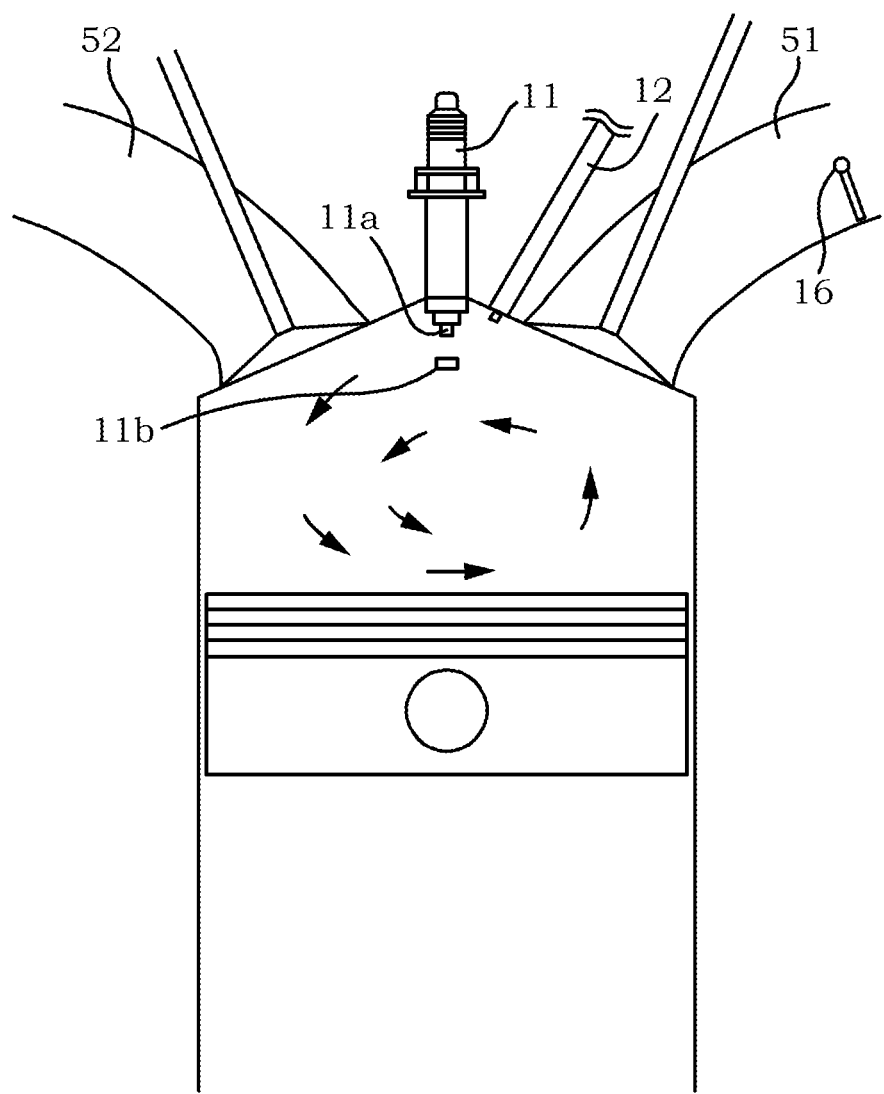
FIG. 9 is a diagram of a tumble flow during a compression stroke.

FIG. 8 is a diagram of the tumble flow generated in the cylinder. FIG. 9 is a diagram showing the attenuation of the tumble flow. In FIGS. 8 and 9, the intake passage 51, the exhaust passage 52, the ignition plug 11, the fuel injection valve 12 and the tumble control valve 16 are shown. Further, the center electrode 11a and the outer electrode 11b of the ignition plug 11 are shown. Furthermore, a tumble flow in the cylinder in the intake stroke is shown by arrows in FIG. 8. A tumble flow in the cylinder in a compression stroke is shown in by arrows in FIG. 9.

If the tumble control valve 16 is closed in the intake stroke, intake air flows in a manner biased toward an upper side of the intake passage 51 in FIG. 8 and flows into the cylinder. As a result, the tumble flow swirling in a vertical direction is formed in the cylinder as shown. Thereafter, the combustion chamber in the cylinder becomes narrower due to an upward movement of a piston in the compression stroke. As the combustion chamber becomes narrower, the tumble flow is squashed, gradually becomes weaker (FIG. 9) and eventually collapses.

Accordingly, if a stratified air-fuel mixture in which a combustible air-fuel mixture is present around the ignition plug 11 and a lean air-fuel mixture is present in other parts is formed and stratified combustion is performed to retard the ignition timing to the second half of the compression stroke, the flow around the ignition plug 11 is weak at the ignition timing. Thus, an arc (hereinafter, also referred to as a plug discharge channel CN) generated between the electrodes 11a and 11b of the ignition plug 11, i.e. in the discharge gap does not sufficiently elongate and misfire and partial burn may occur. It should be noted that "around the ignition plug 11" mentioned here includes the discharge gap of the ignition plug 11.

Accordingly, in the present embodiment, a situation where the plug discharge channel CN elongates is created, utilizing a property of increasing turbulence intensity around the ignition plug 11 by injecting the fuel.

Figure 10:
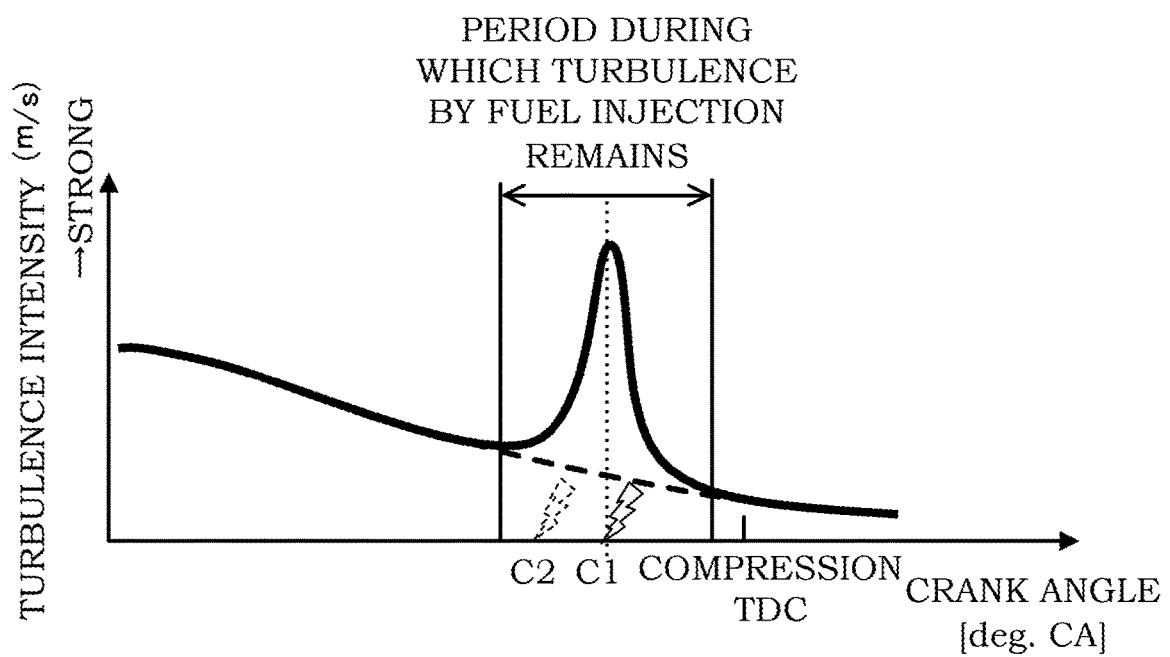
FIG. 10 is a graph showing a change of turbulence intensity around the ignition plug.

FIG. 10 is a timing chart showing a turbulence intensity change around the ignition plug 11 when the fuel was injected in the second half of the compression stroke. A horizontal axis of FIG. 10 represents the crank angle and a vertical axis thereof represents the turbulence intensity around the ignition plug 11. A broken line of FIG. 10 represents a turbulence intensity change when the fuel is not injected in the second half of the compression stroke.

Since the intensity of the tumble flow gradually decreases as described above, the turbulence intensity around the ignition plug 11 also decreases according to this. However, if the fuel is injected in the second half of the compression stroke, the turbulence intensity is enhanced for a predetermined period after the fuel injection. During this period in which the turbulence intensity is increased by the fuel injection, the plug discharge channel CN easily elongates. Particularly, timing C1 at which the turbulence intensity is peaked is suitable as the ignition timing. On the other hand, in the case of performing homogeneous lean combustion to be described later, the fuel is not injected in the second half of the compression stroke. Thus, combustion is slower than in the stratified combustion. Therefore, timing C2 earlier than timing C1 is suitable as the ignition timing in the case of the homogeneous lean combustion.

Figure 11:
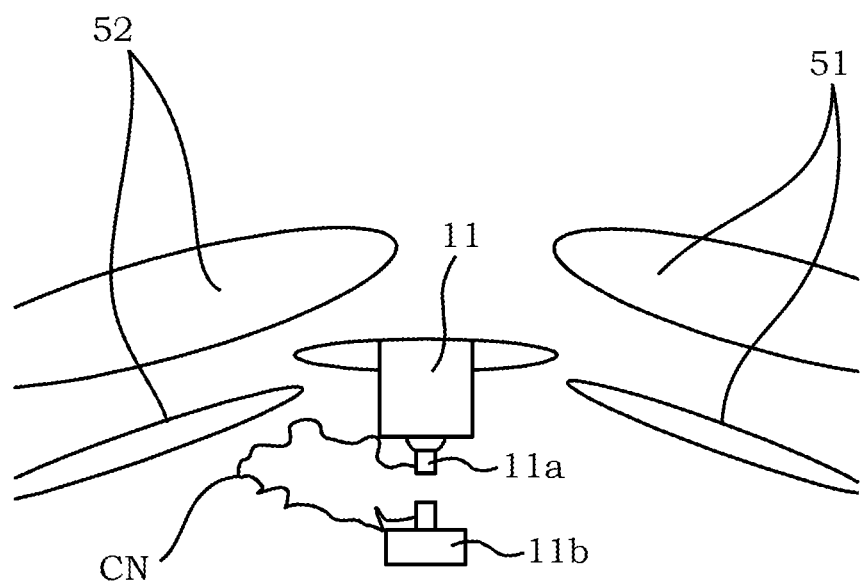
FIG. 11 is a diagram of a plug discharge channel near the ignition plug.

FIG. 11 is a diagram of the plug discharge channel CN. The center electrode 11a and the outer electrode 11b of the ignition plug 11 and the elongated plug discharge channel CN are shown in FIG. 11. Further, the fuel injection valve 12 is omitted here to focus on a state of the plug discharge channel CN. It should be noted that if a flow is given around the ignition plug to sufficiently elongate the plug discharge channel CN, the tip of the fuel injection valve 12 may not necessarily be oriented toward the ignition plug 11. For example, an embodiment may be such that the injected fuel is reflected in the combustion chamber to give a flow around the ignition plug.

The flow around the ignition plug 11 becomes smaller as the tumble flow becomes weaker. Thus, if spark ignition is performed, the plug discharge channel CN is normally generated to substantially linearly straddle between the center electrode 11a and the outer electrode 11b. However, in the present embodiment, spark ignition is performed with the flow around the ignition plug 11 intensified by the fuel injection from the fuel injection valve 12. In this way, the plug discharge channel CN between the center electrode 11a and the outer electrode 11b elongates as shown in FIG. 11.

Since the flow can be given around the ignition plug 11 and the plug discharge channel CN can be elongated after the tumble flow is weakened as just described, it is possible to suppress partial burn and misfire and improve combustion stability.

Figure 12A:
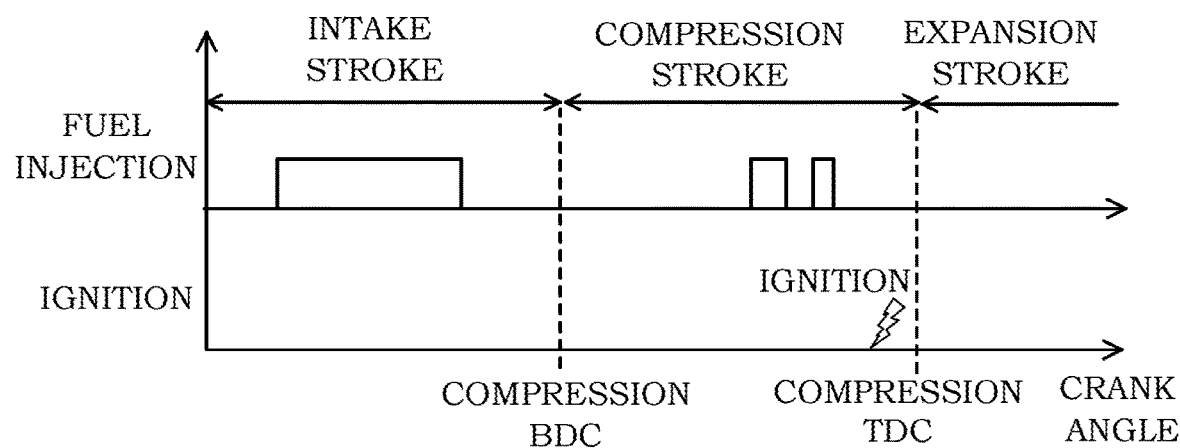
FIG. 12A is a chart showing a relationship of a fuel injection timing and an ignition timing.
Figure 12B:
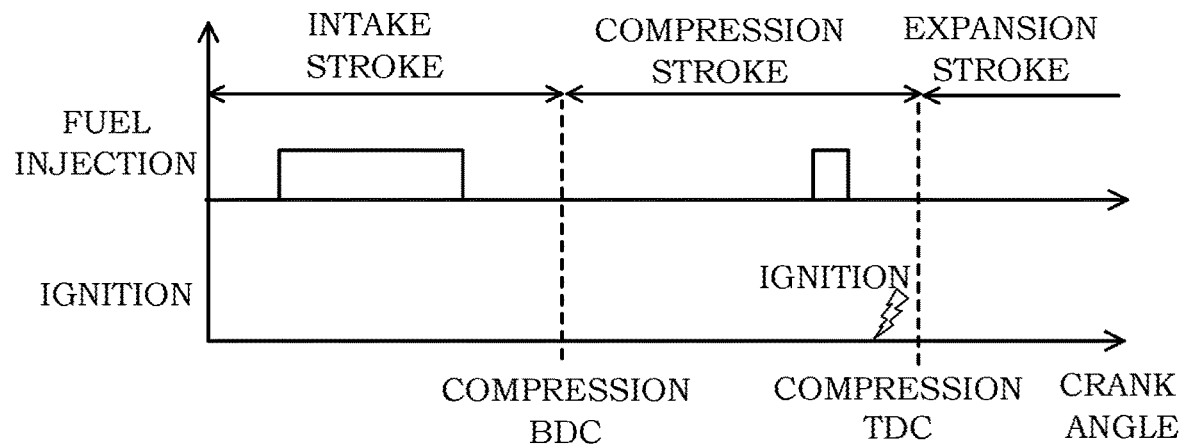
FIG. 12B is a chart showing a relationship of the fuel injection timing and the ignition timing.

FIGS. 12A and 12B are charts showing examples of a fuel injection pattern for elongating the plug discharge channel CN. 90% or more of the total injection amount is injected in the intake stroke in either cases of FIGS. 12A and 12B. The remaining fuel may be divided and injected twice in the second half of the compression stroke (FIG. 12A) or may be injected at one time (FIG. 12B). It should be noted that the total injection amount mentioned here is the amount of the fuel injected per cycle.

It should be noted that, as described above, the amount of the fuel for forming the combustible air-fuel mixture around the ignition plug 11 by being injected in the second half of the compression stroke is 10% or less of the total injection amount in the stratified combustion of the present embodiment. Thus, the combustible air-fuel mixture formed around the ignition plug 11 merely takes up a small portion of the entire combustion chamber. Such stratified combustion may be referred to as "weak stratified combustion" to be distinguished from the stratified combustion in which more fuel is injected in the second half of the compression stroke.

Here, a control executed by the controller 50 is described.

First, a switch of a combustion mode is described.

The controller 50 switches the combustion mode according to operating states of the internal combustion engine 10.

It should be noted that the engine operating states mentioned here are a revolution speed and a load of the internal combustion engine 10. The revolution speed can be calculated by a known method on the basis of a detection value of the crank angle sensor. The load can be calculated by a known method on the basis of a detection value of the accelerator position sensor.

Figure 13:
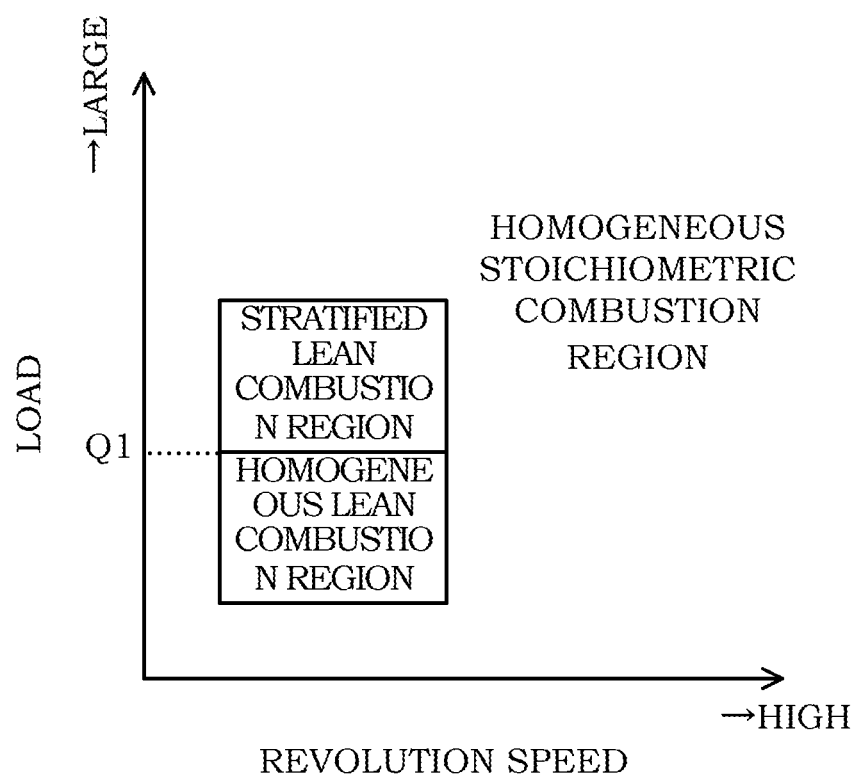
FIG. 13 is a combustion mode map.

FIG. 13 is a map showing the combustion mode executed in each engine operating state. A vertical axis of FIG. 13 represents the load and a horizontal axis represents the revolution speed.

As shown in FIG. 13, a part of a low-medium revolution/low-medium load region is a lean combustion region and the other region is a homogeneous stoichiometric combustion region. The lean combustion region is further divided, and a region having a relatively high load serves as a stratified lean combustion region and a region having a relatively low load serves as a homogeneous lean combustion region with a load Q1 serving as a boundary. The "stratified lean combustion" mentioned here means the stratified combustion described above. The homogeneous stoichiometric combustion is combustion performed with an air-fuel mixture having a stoichiometric air-fuel ratio formed in the entire combustion chamber. The load Q1 is set according to the specification of the internal combustion engine 10 to which the present embodiment is applied.

In either cases of the stratified lean combustion and the homogeneous lean combustion, the controller 50 basically controls an excess air ratio λ of the entire combustion chamber to be 2. However, the excess air ratio λ=2 is not limited in a strict sense and the excess air ratio λ is in such a range as to be substantially 2. Further, the controller 50 may correct the excess air ratio λ toward a side richer than 2 to ensure ignitability and the like as the load increases.

Further, in the following description, an air-fuel ratio A/F may be used instead of the excess air ratio λ. In this case, the excess air ratio λ=2 is shown to be the air-fuel ratio A/F≈30.

Further, the controller 50 reduces the mechanism compression ratio to suppress the occurrence of knocking as the load of the internal combustion engine 10 increases. However, the controller 50 controls the mechanism compression ratio to be higher during the stratified lean combustion than that where the homogeneous lean combustion were to be performed under the same operating conditions. This is because a combustion rate is higher and knocking is less likely to occur in the stratified lean combustion than in the homogeneous lean combustion.

Here, the variable compression ratio control mechanism is described. A known variable compression ratio control mechanism may be used. An example of the known variable compression ratio control mechanism is described here.

Figure 14:
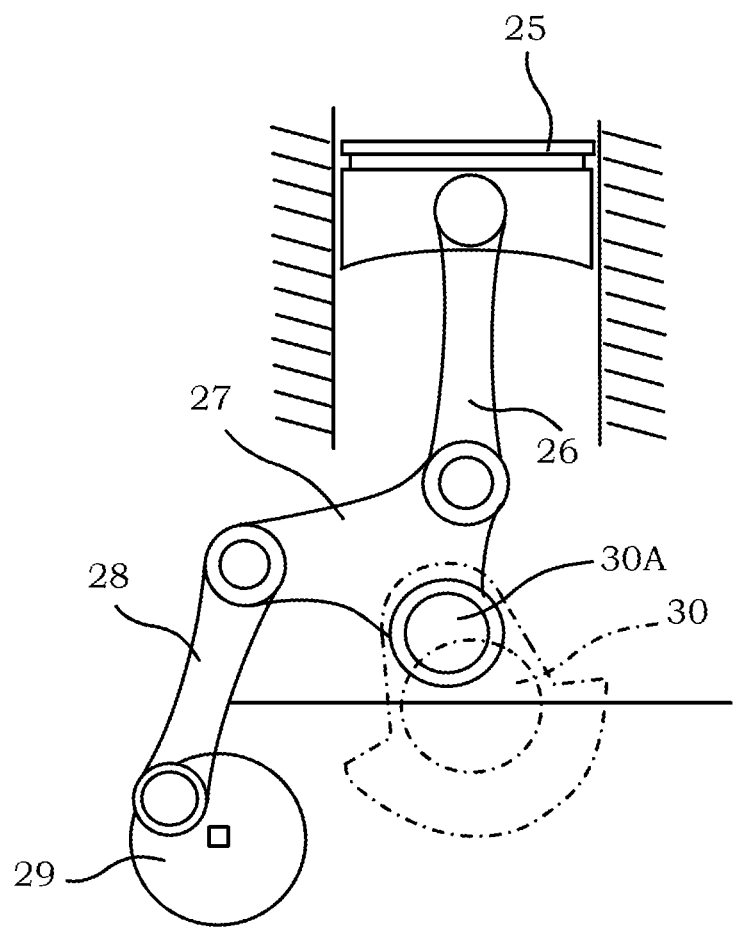
FIG. 14 is a diagram showing an example of a variable compression ratio control mechanism.

FIG. 14 shows a variable compression ratio control mechanism in which a top dead center position of a piston 25 is made variably controllable by coupling the piston 25 and a crankshaft 30 by a plurality of links.

The piston 25 is coupled to the crankshaft 30 via an upper link 26 and a lower link 27. One end of the upper link 26 is rotatably coupled to the piston 25, and the other end is rotatably coupled to the lower link 27. The lower link 27 is rotatably coupled to a crank pin 30A of the crankshaft 30 at a location different from a part coupled to the upper link 26. Further, one end of a control link 28 is rotatably coupled to the lower link 27. The other end of the control link 28 is coupled to a control shaft 29 at a position deviated from a center of rotation.

In the variable compression ratio control mechanism configured as described above, the mechanical compression ratio can be changed by rotating the control shaft 29 by an unillustrated actuator or the like. For example, if the control shaft 29 is rotated by a predetermined angle in a counterclockwise direction in FIG. 14, the lower link 27 rotates in a counterclockwise direction in FIG. 14 about the crank pin 30A via the control link 28. As a result, the top dead center position of the piston 25 moves upward to increase the mechanical compression ratio. Contrary to this, if the control shaft 29 is rotated by a predetermined angle in the clockwise direction in FIG. 14, the lower link 27 rotates in the clockwise direction in FIG. 14 about the crank pin 30A via the control link 28. As a result, the top dead center position of the piston 25 moves downward to reduce the mechanical compression ratio.

Next, ignition energy during the homogeneous lean combustion and during the stratified lean combustion is described.

Figure 15:
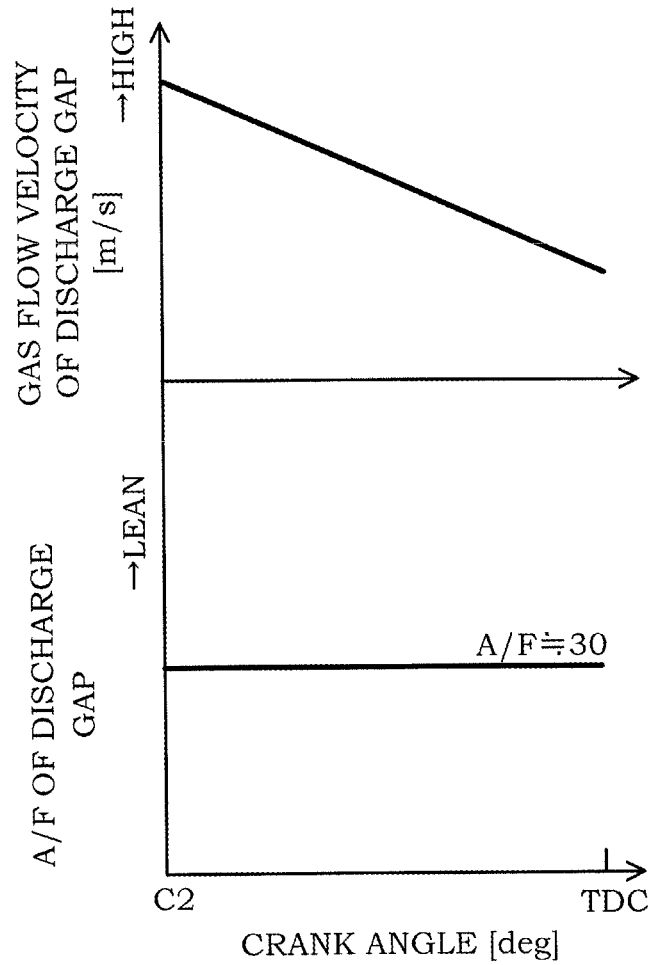
FIG. 15 is a chart of a gas flow velocity in a discharge gap and an air-fuel ratio in the discharge gap during homogeneous lean combustion.

FIG. 15 is a chart showing a gas flow velocity in the discharge gap and a change of the air-fuel ratio A/F of the discharge gap during the homogeneous lean combustion. A horizontal axis of FIG. 15 represents the crank angle [deg] and a state on and after timing C2 of FIG. 10 is shown.

Figure 16:
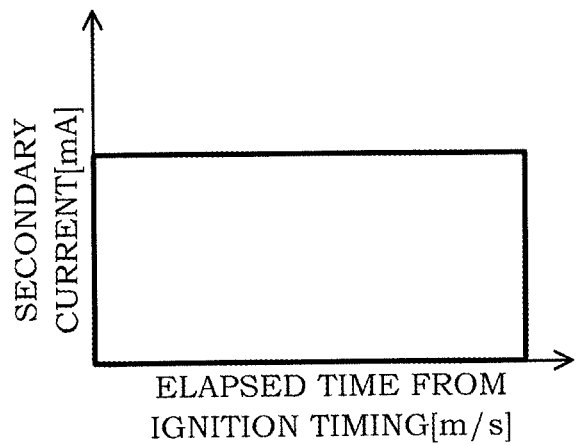
FIG. 16 is a chart showing a relationship of an elapsed time from an ignition timing and a secondary current during the homogeneous lean combustion.

FIG. 16 is a chart showing a relationship of an elapsed time from the ignition timing and a secondary current flowing into the ignition plug 11 during the homogeneous lean combustion.

Figure 17:
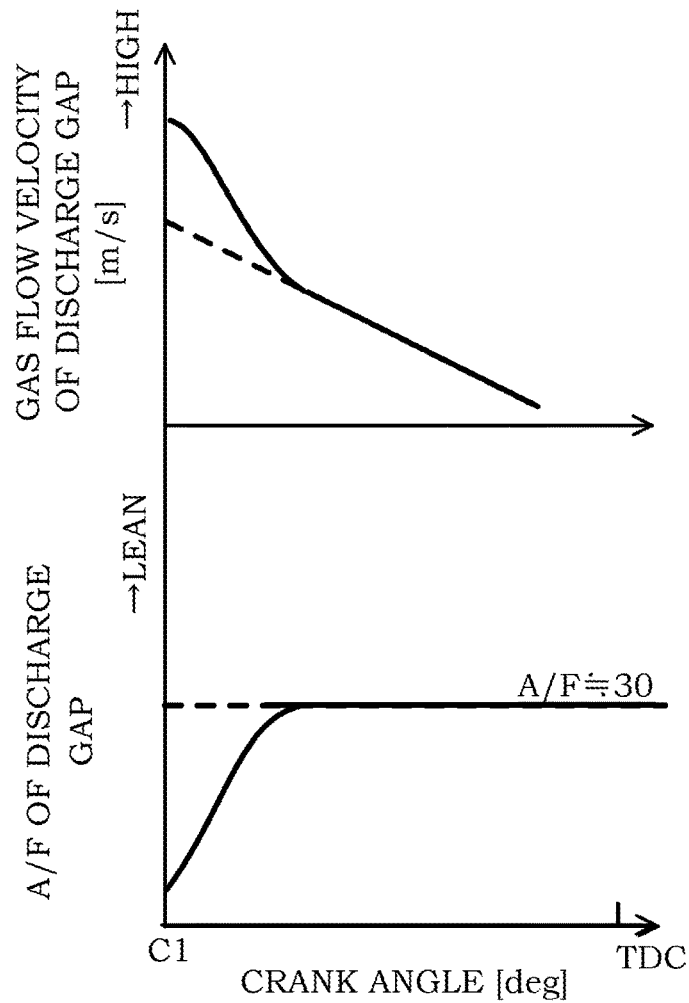
FIG. 17 is a chart of the gas flow velocity in the discharge gap and the air-fuel ratio in the discharge gap during stratified lean combustion.

FIG. 17 is a chart showing the gas flow velocity in the discharge gap and the change of the air-fuel ratio A/F of the discharge gap during the homogeneous lean combustion. A horizontal axis of FIG. 17 represents the crank angle [deg] and a state on and after timing C1 of FIG. 10 is shown.

Figure 18:
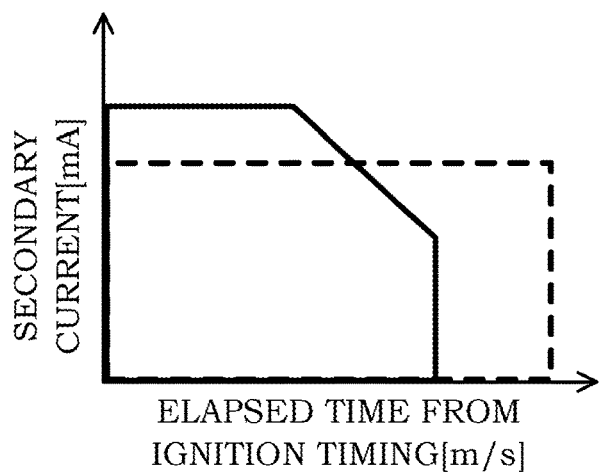
FIG. 18 is a chart showing a relationship of the elapsed time from the ignition timing and the secondary current during the stratified lean combustion.

FIG. 18 is a chart showing a relationship of the elapsed time from the ignition timing and the secondary current flowing into the ignition plug 11 during the stratified lean combustion. It should be noted that a broken line in FIG. 18 is a chart during the homogeneous lean combustion of FIG. 16.

The "gas flow velocity in the discharge gap" in FIGS. 15 and 17 is synonymous with the turbulence intensity described with reference to FIG. 10.

During the homogeneous lean combustion, the gas flow velocity in the discharge gap decreases as the crank angle advances. Further, since the excess air ratio λ of the entire combustion chamber is controlled to be 2, i.e. the air-fuel ratio A/F is controlled to be substantially 30 during the homogeneous lean combustion, the air-fuel ratio A/F of the discharge gap is substantially 30 as a matter of course.

In contrast, during the stratified lean combustion, spark ignition is performed after the fuel is injected in the second half of the compression stroke. Thus, the gas flow velocity in the discharge gap at the ignition timing is higher than during the homogeneous lean combustion. However, since an effect of increasing the gas flow velocity by the fuel injection is gradually attenuated, the gas flow velocity in the discharge gap eventually becomes equal to that during the homogeneous lean combustion.

Further, the air-fuel ratio A/F of the discharge gap at the ignition timing becomes richer than during the homogeneous lean combustion by the fuel injection in the second half of the compression stroke. However, since the fuel injected in the second half of the compression stroke is diffused by a penetration force thereof and the tumble flow, the air-fuel ratio A/F of the discharge gap gradually returns to 30.

Since the A/F of the discharge gap is substantially 30, which is drastically leaner than a stoichiometric air-fuel ratio, during the homogeneous lean combustion, the air-fuel mixture in the discharge gap is less likely to be ignited than during the stratified lean combustion. Further, during the homogeneous lean combustion, the combustion rate is slower than during the stratified lean combustion. Thus, during the homogeneous lean combustion, a relatively large secondary current needs to continuously flow to obtain stable combustion.

On the other hand, since the gas flow velocity in the discharge gap at the ignition timing is higher during the stratified lean combustion than during the homogeneous combustion, the secondary current needs to be set higher than that during the homogeneous lean combustion to form an initial flame kernel without being blown out by the gas flow. However, since the air-fuel mixture in the discharge gap is more easily ignited than during the homogeneous lean combustion as described above, stable combustion is obtained even if the secondary current is reduced once combustion starts. Thus, during the stratified lean combustion, the secondary current can be reduced after the ignition timing. Further, since the air-fuel mixture in the discharge gap is more easily ignited than during the homogeneous lean combustion as described above, it is also possible to set the discharge time shorter during the stratified lean combustion than during the homogeneous lean combustion.

During the stratified lean combustion, ignition energy consumed per cycle can be made smaller than during the homogeneous lean combustion by reducing the secondary current or shortening the discharge time after the ignition timing as described above.

As described above, a discharge waveform suitable during the stratified lean combustion and that suitable during the homogeneous lean combustion are different. The discharge waveform mentioned here means a history of the secondary current shown in FIGS. 16 and 18.

Accordingly, the controller 50 controls the driving device 17 such that a constant secondary current flows during the homogeneous lean combustion, whereas a relatively large secondary current flows at the ignition timing and, thereafter, the secondary current becomes smaller during the stratified lean combustion.

It should be noted that the waveform of the secondary current shown in FIG. 18 is only an example and may be another waveform if the secondary current is relatively large at the ignition timing and, thereafter, becomes smaller, and the ignition energy is lower than during the homogeneous lean combustion. Various waveforms such as a waveform in which the secondary current becomes gradually smaller according to the elapsed time from the ignition timing and a waveform in which the secondary current has a constant value for a predetermined time following the ignition timing and becomes smaller in a stepwise manner after the elapse of the predetermined time are conceivable.

Figure 19:
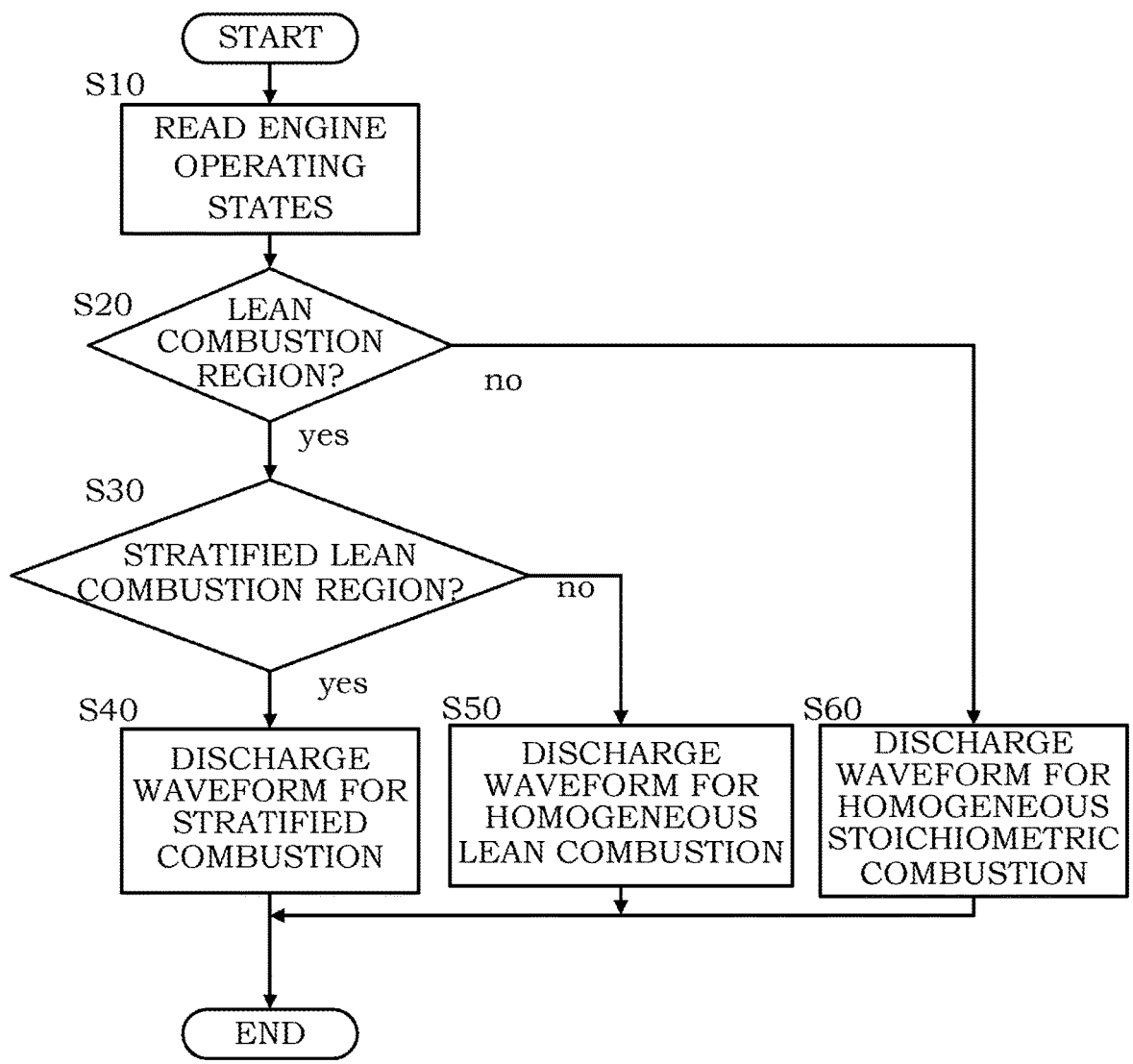
FIG. 19 is a flow chart showing a control routine stored in a controller.

FIG. 19 is a flow chart specifically showing the control contents described above as a control routine. This control routine is programmed in the controller 50.

In Step S10, the controller 50 reads the engine operating states. Specifically, the revolution speed and the load of the internal combustion engine 10 are read.

In Step S20, the controller 50 determines whether or not the current operating region is the lean combustion region using the engine operating states read in Step S10 and the map of FIG. 13. The controller 50 performs a processing of Step S30 if the current operating region is the lean combustion region and performs a processing of Step S60 if the current operating region is the homogeneous stoichiometric combustion region.

In Step S30, the controller 50 determines whether or not the current operating region is the stratified lean combustion region. The controller 50 performs a processing of Step S40 if the current operating region is the stratified lean combustion region and performs a processing of Step S50 if the current operating region is the homogeneous lean combustion region.

In Step S40, the controller 50 controls the driving device 17 to attain the aforementioned discharge waveform for stratified lean combustion.

In Step S50, the controller 50 controls the driving device 17 to attain the aforementioned discharge waveform for homogeneous lean combustion.

In Step S60, the controller 50 controls the driving device 17 to attain the discharge waveform for homogeneous stoichiometric combustion. The discharge waveform for homogeneous stoichiometric combustion is basically similar to the discharge waveform for homogeneous lean combustion, but has a smaller secondary current and a shorter discharge time than the discharge waveform for homogeneous lean combustion.

Next, functions and effects achieved by executing the above control routine are described.

Figure 20:
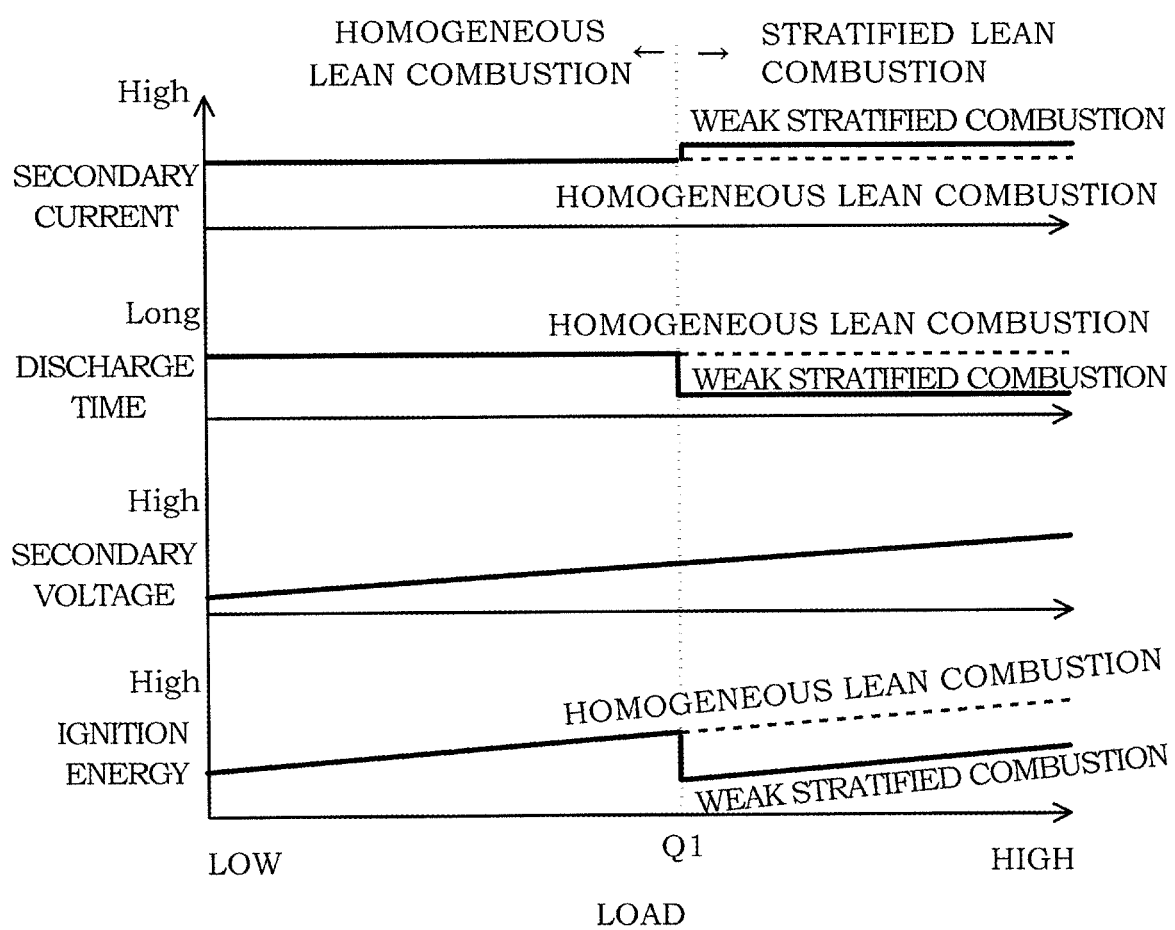
FIG. 20 is a chart showing relationships of the secondary current, a discharge time, a secondary voltage and ignition energy with a load of an internal combustion engine in a lean combustion region.

FIG. 20 is a chart showing relationships of the secondary current, the discharge time, a secondary voltage and the ignition energy with the load of the internal combustion engine 10 in the lean combustion region. A load Q1 in FIG. 20 is equal to the load Q1 in FIG. 13. Values when it is assumed that the homogeneous lean combustion is performed in the entire lean combustion region, i.e. even in a relatively high load region are shown for comparison by broken lines in FIG. 20. The secondary current in FIG. 20 is a current value at the ignition timing. As described above, the controller 50 executes a control to reduce the secondary current after the ignition timing.

The secondary current during the stratified lean combustion is higher than the secondary current when the homogeneous lean combustion is performed in this region. However, since the controller 50 executes the control to reduce the secondary current after the ignition timing, the secondary current in the stratified lean combustion region is smaller than the secondary current when the homogeneous lean combustion is performed in this region from the middle to late stages of the discharge period.

The discharge time during the stratified lean combustion is shorter than the discharge time when the homogeneous lean combustion is performed in this region.

Over the entire lean combustion region, the secondary voltage increases as the load increases and, associated with this, the ignition energy also increases. However, since the stratified lean combustion is performed with the secondary current and the discharge time controlled as described above in the relatively high load region, the ignition energy is smaller in this region than when the homogeneous lean combustion is performed.

Figure 21:
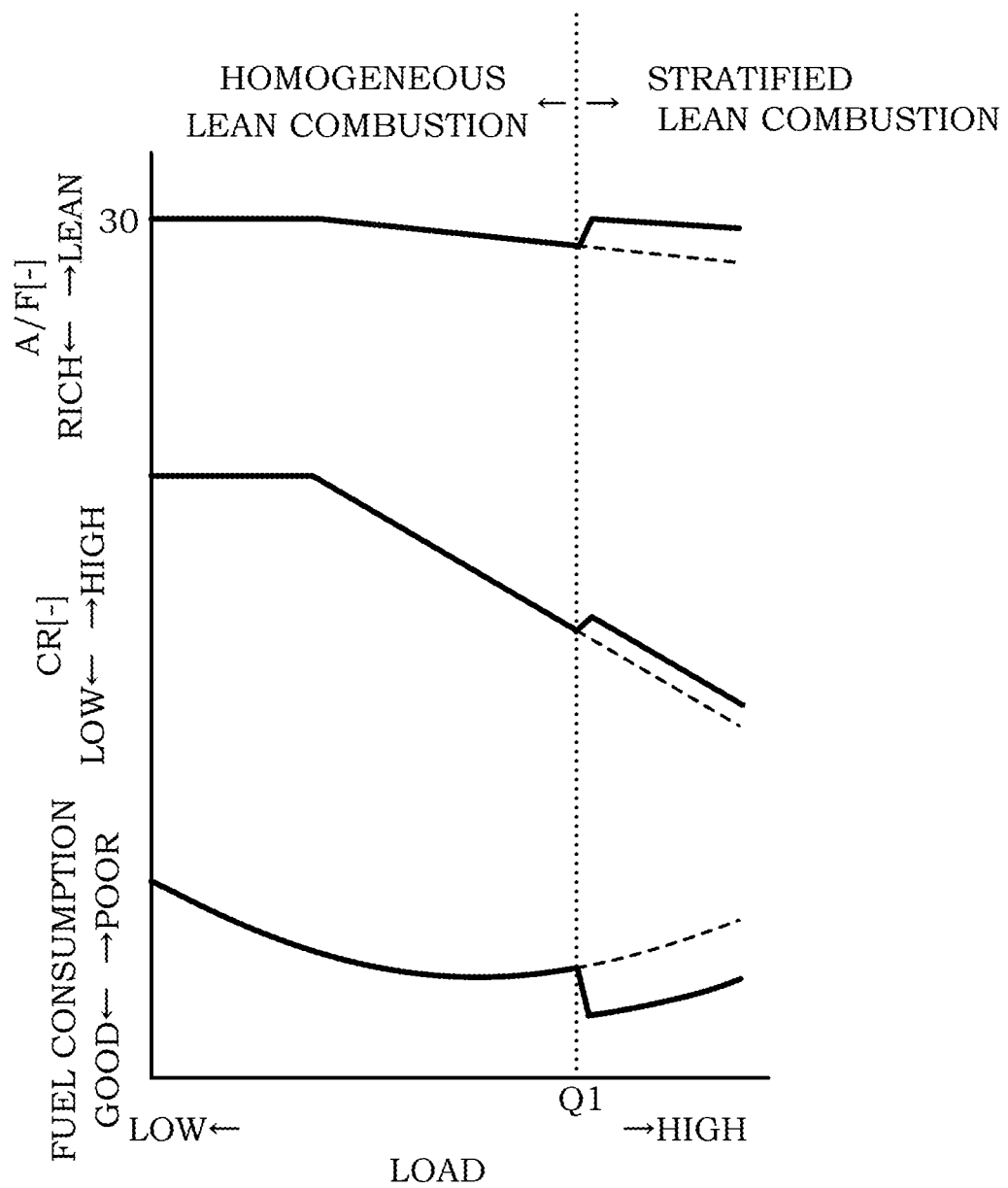
FIG. 21 is a chart showing relationships of an air-fuel ratio in an entire combustion chamber, a mechanical compression ratio and fuel economy with the load of the internal combustion engine in the lean combustion region.

FIG. 21 is a chart showing relationships of the air-fuel ratio in the entire combustion chamber, the mechanical compression ratio and fuel economy with the load of the internal combustion engine 10 in the lean combustion region. A load Q1 in FIG. 21 is equal to the load Q1 in FIG. 13. Values when it is assumed that the homogeneous lean combustion is performed in the entire lean combustion region, i.e. even in the relatively high load region are shown for comparison by broken lines in FIG. 21.

The controller 50 enriches the air-fuel ratio to be higher than 30 in the entire combustion chamber to ensure ignitability and the like as the load increases. However, in the case of the stratified lean combustion, the equivalent ratio around the ignition plug 11 increases due to the fuel injection in the second half of the compression stroke, whereby ignition becomes easier. Thus, the air-fuel ratio in the entire combustion chamber can be made leaner in the case of the stratified lean combustion than in the case of the homogeneous lean combustion in the same region.

Further, the controller 50 reduces the mechanical compression ratio to suppress the occurrence of knocking as the load increases. However, in the case of the stratified lean combustion, the equivalent ratio around the ignition plug 11 increases due to the fuel injection in the second half of the compression stroke to accelerate flame propagation, whereby knocking becomes less likely to occur. Thus, in the case of the stratified lean combustion, the mechanical compression can be made higher than in the case of the homogeneous lean combustion in the same region.

As described above, if the stratified lean combustion is performed in the relatively high load region, the air-fuel ratio in the entire combustion chamber can be made leaner and the mechanical compression ratio can be made higher as compared to the case where the homogeneous lean combustion is performed in the same region. As a result, fuel economy in the relatively high load region is better as compared to the case where the homogeneous lean combustion is performed in the same region.

As described above, the control method for the internal combustion engine 10 of the present embodiment is a control method for internal combustion engine for forming a stratified air-fuel mixture in a combustion chamber and performing stratified combustion by injecting fuel at least once each time between an intake stroke and the first half of a compression stroke and in the second half of the compression stroke. In the present embodiment, spark ignition is started by flowing a relatively large secondary current (also referred to as a discharge current) into the ignition plug 11 when the flow energy around the ignition plug 11 is increased by the energy of the fuel sprays injected in the second half of the compression stroke and, thereafter, the secondary current is made relatively smaller and discharged for a predetermined period. The secondary current is made relatively large when spark ignition is started in order to form a discharge channel by overcoming the flow around the ignition plug 11 strengthened by the fuel injection in the second half of the compression stroke. The secondary current is reduced thereafter because the air-fuel mixture around the ignition plug 11 is easily burned due to the increased equivalent ratio caused by the fuel injection in the second half of the compression stroke and stable combustion is obtained with less ignition energy. By controlling the discharge waveform to a waveform suitable for stratified combustion during the stratified lean combustion in this way, fuel economy can be improved while the ignition energy during the stratified lean combustion is reduced.

In the present embodiment, in the lean combustion region, the stratified combustion is performed in the operating region where the load of the internal combustion engine 10 is relatively high, and the homogeneous lean combustion is performed in the operating region where the load of the internal combustion engine 10 is relatively low. The discharge waveform of the ignition plug during the stratified combustion and that during the homogeneous lean combustion are made different. In this way, the discharge waveform suitable for each combustion mode can be set during the stratified combustion and during the homogeneous lean combustion.

In the present embodiment, the excess air ratio $\lambda$ in the entire combustion chamber is controlled to be 2 in either cases of the stratified combustion and the homogeneous lean combustion. In this way, the lean operating region becomes larger than in the case of performing the stoichiometric combustion in all the regions other than the stratified lean combustion region, wherefore fuel economy is improved.

In the present embodiment, the discharge period (discharge duration) of the ignition plug 11 during the homogeneous lean combustion is set longer than the discharge period during the stratified combustion. During the homogeneous lean combustion, ignitability is lower and combustion is slower than during the stratified lean combustion, but combustion is stabilized by extending the discharge time. As a result, fuel economy can be improved and emissions can be reduced.

In the present embodiment, the ignition energy during the homogeneous lean combustion is made larger than that during the stratified combustion. To make the ignition energy larger, a cumulative value of the secondary current during the discharge period may be increased, for example, by extending the discharge time or increasing the secondary current. In this way, combustion during the homogeneous lean combustion is stabilized, wherefore fuel economy can be improved and emissions can be reduced.

Although the embodiment of the present invention has been described above, the above embodiment is merely an illustration of one application example of the present invention and is not intended to limit the technical scope of the present invention to the specific configuration of the above embodiment.

The invention claimed is:

1. A control device for internal combustion engine, comprising:
   a fuel injection valve configured to directly inject fuel into a combustion chamber;
   an ignition plug configured to spark-ignite an air-fuel mixture formed in the combustion chamber;
   a driving device configured to drive the ignition plug; and
   a control unit configured to control the fuel injection valve and the driving device;
   the control unit:
   setting a part of a low-medium revolution speed/low-medium load region of the internal combustion engine as a lean combustion region;
   forming a stratified air-fuel mixture in a combustion chamber and performing stratified combustion by injecting the fuel at least once each time between an intake stroke and a first half of a compression stroke and in a second half of the compression stroke in an operating region of the lean combustion region where a load is relatively high;
   forming a homogeneous air-fuel mixture in the combustion chamber and performing homogeneous combustion by injecting the fuel at least once between the intake stroke and the first half of the compression stroke in an operating region of the lean combustion region where the load is relatively low;
   making a discharge waveform of the ignition plug during the stratified combustion and a discharge waveform of the ignition plug during the homogeneous combustion different;
   starting spark ignition by flowing a relatively large discharge current into the ignition plug when flow energy around the ignition plug is increased by energy of a fuel spray injected in the second half of the compression stroke and, thereafter, making the discharge current relatively smaller and discharging the discharge current for a predetermined period during the stratified combustion; and the relatively large discharge current at the time of starting spark ignition during stratified charge combustion is larger than a discharge current at the time of homogeneous charge combustion.

2. A control method for internal combustion engine, a part of a low-medium revolution speed/low-medium load region of the internal combustion engine being set as a lean combustion region, comprising:

forming a stratified air-fuel mixture in a combustion chamber by injecting fuel at least once each time between an intake stroke and a first half of a compression stroke and in a second half of the compression stroke and performing stratified combustion in an operating region of the lean combustion region where a load is relatively high;

forming a homogeneous air-fuel mixture in the combustion chamber by injecting the fuel at least once between the intake stroke and the first half of the compression stroke and performing homogeneous combustion in an operating region of the lean combustion region where the load is relatively low;

making a discharge waveform of the ignition plug during the stratified combustion and a discharge waveform of the ignition plug during the homogeneous combustion different;

starting spark ignition by flowing a relatively large discharge current into the ignition plug when flow energy around the ignition plug is increased by energy of a fuel spray injected in the second half of the compression stroke and, thereafter, making the discharge current relatively smaller and discharging the discharge current for a predetermined period during the stratified combustion; and the relatively large discharge current at the time of starting spark ignition during stratified charge combustion is larger than a discharge current at the time of homogeneous charge combustion.

3. The control method for internal combustion engine according to claim 2, wherein:

an excess air ratio in the entire combustion chamber is controlled to be 2 in either cases of the stratified combustion and the homogeneous combustion.

4. The control method for internal combustion engine according to claim 2, wherein:

a discharge duration of the ignition plug during the homogeneous combustion is made longer than a discharge duration of the ignition plug during the stratified combustion.

5. The control method for internal combustion engine according to claim 4, wherein:

ignition energy during the homogeneous combustion is made larger than ignition energy during the stratified combustion.

* * * * *